United States Patent
Amaki et al.

(10) Patent No.: US 11,391,849 B2
(45) Date of Patent: Jul. 19, 2022

(54) SATELLITE SIGNAL ACQUIRING APPARATUS AND METHOD

(71) Applicants: Kabushiki Kaisha Toshiba, Tokyo (JP); Toshiba Infrastructure Systems & Solutions Corporation, Kanagawa (JP)

(72) Inventors: Satoru Amaki, Tokyo (JP); Manabu Mukai, Kanagawa (JP); Noriyuki Imoto, Tokyo (JP); Shigeyuki Numaguchi, Tokyo (JP)

(73) Assignees: Kabushiki Kaisha Toshiba, Tokyo (JP); Toshiba Infrastucture Systems & Solutions Corporation, Kawasaki (JP)

( * ) Notice: Subject to any disclaimer, the term of this patent is extended or adjusted under 35 U.S.C. 154(b) by 787 days.

(21) Appl. No.: 15/948,361

(22) Filed: Apr. 9, 2018

(65) Prior Publication Data

US 2018/0316089 A1 Nov. 1, 2018

(30) Foreign Application Priority Data

Apr. 28, 2017 (JP) .............................. JP2017-090469

(51) Int. Cl.
*G01S 19/26* (2010.01)
*G01S 19/38* (2010.01)
(Continued)

(52) U.S. Cl.
CPC .............. *G01S 19/26* (2013.01); *G01S 19/38* (2013.01); *H01Q 3/08* (2013.01); *H04B 7/18517* (2013.01); *H04B 17/27* (2015.01)

(58) Field of Classification Search
CPC ........... G01S 19/38; G01S 19/26; H01Q 3/08; H01Q 3/01; H01Q 3/32; H01Q 3/34; H01Q 3/02; H04B 7/18517; H04B 17/27
(Continued)

(56) References Cited

U.S. PATENT DOCUMENTS 4,630,056 A * 12/1986 Noguchi .................. H01Q 1/18
342/359
5,422,648 A * 6/1995 Uematsu ................... G01S 3/48
342/359
(Continued)

FOREIGN PATENT DOCUMENTS

JP 02-002701 A 1/1990
JP 09-135113 A 5/1997
(Continued)

*Primary Examiner* — Chuong P Nguyen
(74) *Attorney, Agent, or Firm* — Baker Botts L.L.P.

(57) ABSTRACT

According to the embodiments, a satellite signal acquiring apparatus includes an antenna, a direction sensor, a position sensor and a processor. The antenna receives radio waves from satellites. The direction sensor obtains direction information. The position sensor obtains position information. The processor directs the antenna based on the direction information obtained by the direction sensor to search a search range including a satellite target angle that is associated with the position information obtained by the position sensor for the satellite. The processor calculates a level of reliability of the direction information obtained by the direction sensor. The processor narrows the search range in accordance with the level of reliability.

17 Claims, 13 Drawing Sheets

(51) Int. Cl.
  *H04B 17/27* (2015.01)
  *H01Q 3/08* (2006.01)
  *H04B 7/185* (2006.01)

(58) Field of Classification Search
  USPC .................. 342/367, 350, 357.21, 357.65
  See application file for complete search history.

(56) References Cited

U.S. PATENT DOCUMENTS

| | | | | |
|---|---|---|---|---|
| 5,900,836 | A * | 5/1999 | Nishikawa | H01Q 1/1257 342/359 |
| 6,034,643 | A * | 3/2000 | Nishikawa | H01Q 3/08 343/765 |
| 6,577,281 | B2 * | 6/2003 | Yamamoto | H01Q 3/08 343/766 |
| 7,965,229 | B2 * | 6/2011 | Mizuochi | G01S 19/40 342/357.23 |
| 9,494,428 | B2 * | 11/2016 | Mizuochi | G01S 19/49 |
| 10,020,575 | B2 * | 7/2018 | Jo | H01Q 19/134 |
| 10,038,239 | B2 * | 7/2018 | Uchiyama | H01Q 3/08 |
| 10,753,741 | B2 * | 8/2020 | Kobayashi | G01R 33/0206 |
| 10,948,292 | B2 * | 3/2021 | Toda | G01S 19/55 |
| 11,264,694 | B2 * | 3/2022 | Enano | H01Q 1/18 |
| 2003/0083816 | A1 * | 5/2003 | Imakado | G01S 19/05 701/469 |
| 2005/0280593 | A1 * | 12/2005 | Cha | H01Q 1/34 343/757 |
| 2007/0103366 | A1 * | 5/2007 | Park | H01Q 1/3275 342/359 |
| 2009/0096670 | A1 * | 4/2009 | Mizuochi | G01S 19/40 342/357.23 |
| 2010/0302030 | A1 * | 12/2010 | Yamada | G01S 19/42 340/539.13 |
| 2013/0338915 | A1 * | 12/2013 | Mizuochi | G01S 19/49 701/500 |
| 2016/0146946 | A1 * | 5/2016 | Gobara | G01S 19/19 702/94 |
| 2019/0217974 | A1 * | 7/2019 | Aymes | G01S 3/043 |

FOREIGN PATENT DOCUMENTS

| | | | |
|---|---|---|---|
| JP | 2013-140173 A | 7/2013 | |
| JP | 2015-037237 A | 2/2015 | |
| JP | 2017-213945 A | 12/2017 | |
| WO | WO-2021/199218 A1 * | 10/2021 | ............ H04B 7/155 |

* cited by examiner

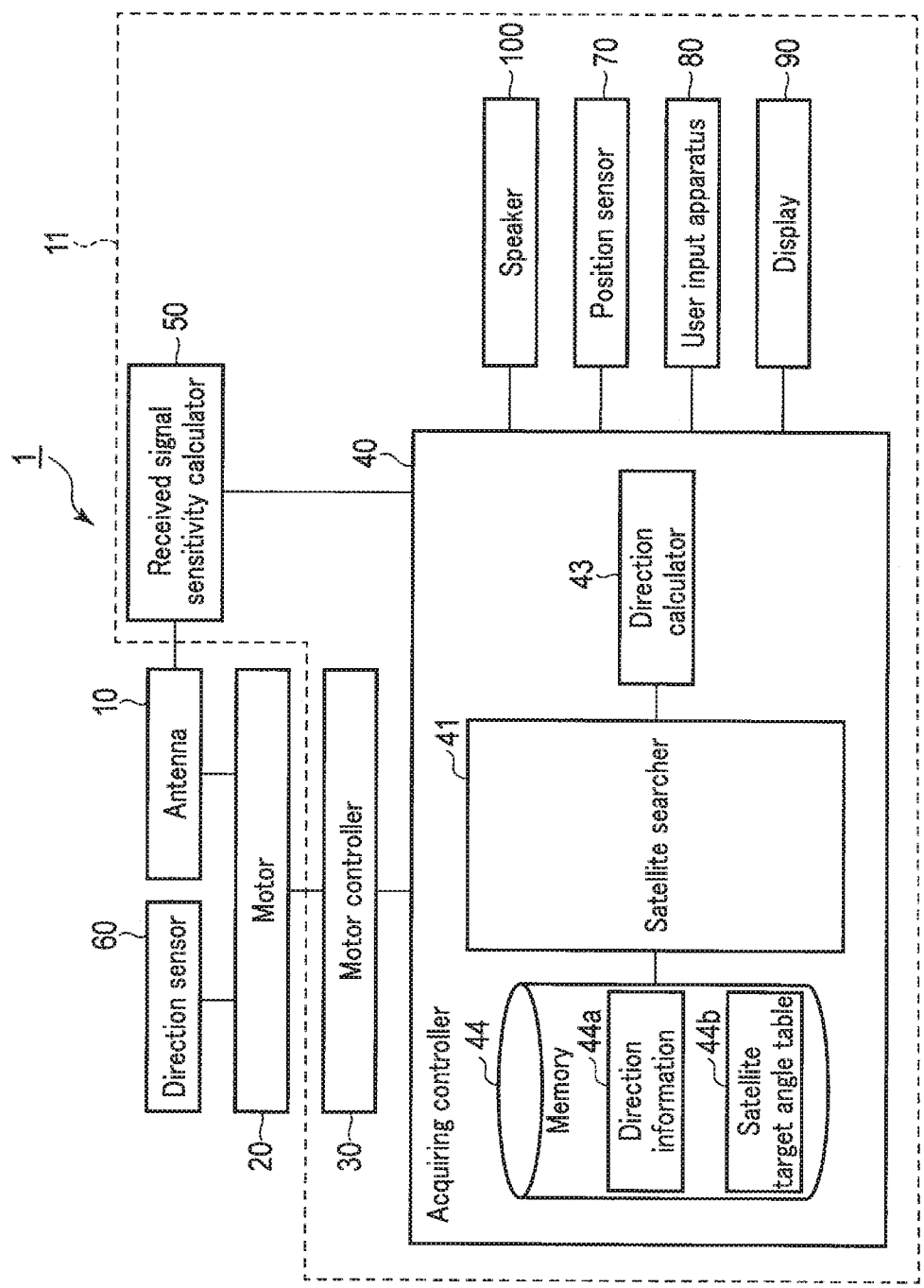
F I G. 2

| Measurement type | Time of measurement | Azimuth angle[°] | Geomagnetic intensity[μT] |
|---|---|---|---|
| Initial | 2017/01/20 15:00:00.000 | 45.22 | 47.52 |
| Rotary | 2017/01/20 15:00:01.000 | 46.20 | 47.52 |
| Rotary | 2017/01/20 15:00:01.100 | 47.21 | 47.52 |
| Rotary | 2017/01/20 15:00:01.200 | 48.22 | 47.53 |
| Rotary | 2017/01/20 15:00:01.300 | 49.21 | 47.52 |
| ⋮ | ⋮ | ⋮ | ⋮ |

| Prefecture | City | Latitude | Longitude | Communication satellite A | | | Communication satellite B | | |
|---|---|---|---|---|---|---|---|---|---|
| | | | | Azimuth angle | Elevation angle | Polarization angle | Azimuth angle | Elevation angle | Polarization angle |
| Hokkaido | Sapporo-shi | 141.4 | 43.1 | 151.2 | 36.1 | 10.4 | 176.2 | 40.2 | 9.2 |
| Hokkaido | Hakodate-shi | 140.7 | 41.8 | 149.7 | 37.1 | 8.9 | 175.1 | 41.6 | 8.3 |
| Hokkaido | Otaru-shi | 141.0 | 43.2 | 150.7 | 35.9 | 10.1 | 175.6 | 40.1 | 8.8 |
| ... | ... | ... | ... | ... | ... | ... | ... | ... | ... |
| Tokyo | Chiyoda-ku | 139.7 | 35.7 | 144.9 | 42.3 | 3.2 | 172.7 | 48.3 | 6.0 |
| Tokyo | Hachioji-shi | 139.3 | 35.7 | 144.3 | 42.1 | 2.8 | 172.0 | 48.3 | 5.5 |
| ... | ... | ... | ... | ... | ... | ... | ... | ... | ... |

F I G. 5

| Reliability of azimuth | Search range[°] |
|---|---|
| 1 to 0.95 | 10 |
| 0.95 to 0.9 | 20 |
| 0.9 or below | 30 |

FIG. 8

SATELLITE SIGNAL ACQUIRING APPARATUS AND METHOD

CROSS-REFERENCE TO RELATED APPLICATIONS

This application is based upon and claims the benefit of priority from the Japanese Patent Application No. 2017-090469, filed Apr. 28, 2017, the entire contents of which are incorporated herein by reference.

FIELD

Embodiments of the present invention relate to a satellite signal acquiring apparatus and a satellite signal acquiring method applicable to a satellite communication apparatus, for example.

BACKGROUND

A VSAT (very small aperture terminal) is a generic name for an apparatus having a relatively small antenna aperture among apparatuses for communicating with an artificial satellite. An apparatus that is downsized to an extent that the apparatus can be installed on a car or can be carried by a user is known. As a VSAT has high portability, a VSAT has been used in a disaster site. A VSAT is often used in cooperation with mobile communication infrastructure.

For communication with a satellite, it is important to accurately acquire a satellite signal and to correctly direct the antenna surface in the direction of a satellite. Conventionally, there was no other choice but to rely on a skilled technician for adjusting an antenna angle; however, in recent years, a technique of automatic satellite signal acquiring has been proposed. However, this type of technique has a problem of taking a long time to acquire a satellite signal, and there is room for improvement.

BRIEF DESCRIPTION OF THE DRAWINGS

FIG. 2 is a function diagram showing an example of the satellite communication apparatus 1 shown in FIG. 1;

FIG. 3 is a drawing for explaining geomagnetism;

FIG. 4 is a diagram showing an example of direction information 44a;

FIG. 5 is a diagram showing an example of a satellite target angle table 44b;

FIG. 8 is a diagram showing an example of a relationship between reliability of the direction information and a search range;

DETAILED DESCRIPTION

Figure 1:
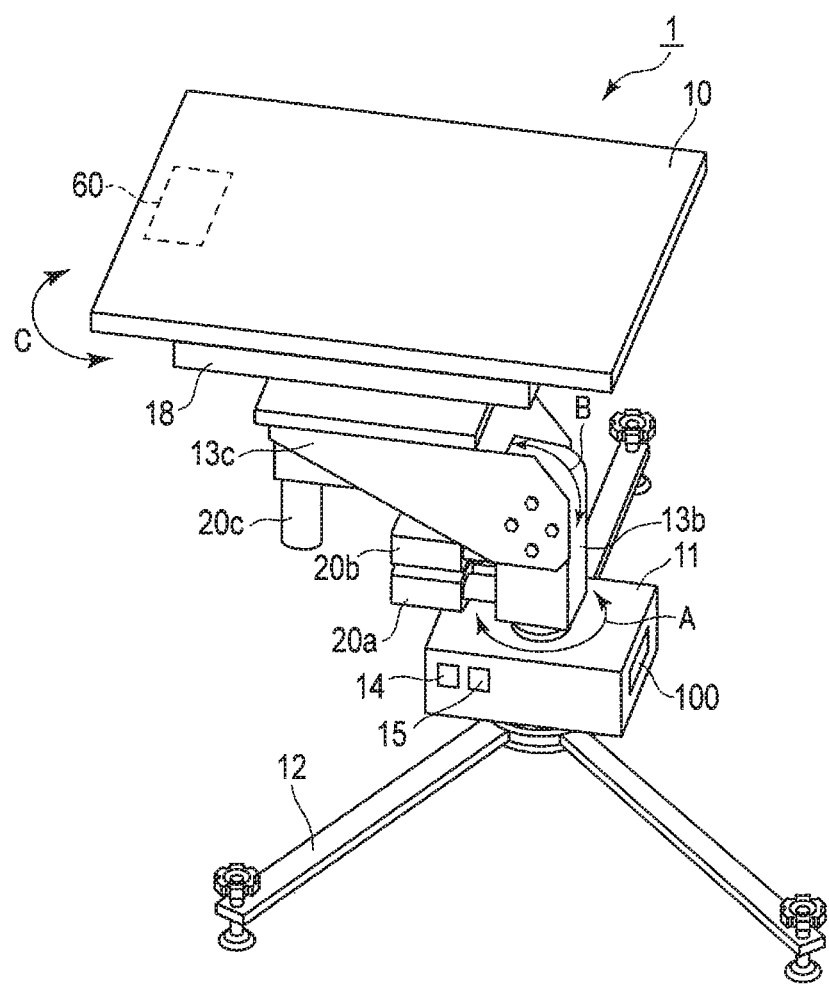
FIG. 1 is a schematic external view of an example of a satellite communication apparatus according to an embodiment.

A satellite communication system includes a plurality of earth stations. Each earth station communicates with each other through an artificial satellite (a satellite) on a stationary orbit. This type of system is applicable to, for example, a disaster prevention system in a wide-spread municipal area, such as a prefecture. For example, a video from a satellite communication apparatus provided in a disaster site, etc. can be transmitted in real-time to an earth station located in a prefectural capital through a satellite network. It thus becomes possible for a headquarters to know immediately and accurately of a disaster situation. It is also possible to hold a VoIP (Voice over IP) telephone communication or a TV conference using a satellite network, and such a system is also applicable to information sharing between related units and to disaster countermeasure consultation.

A technique of acquiring a satellite by measuring an intensity of received radio waves while rotating an antenna by a driving apparatus and by directing the antenna to a direction in which the intensity becomes maximum is known. Specifically, an azimuth angle (AZ), an elevation angle (EL), and a polarization angle (POL) may be individually adjusted, and radio wave intensity in the vicinity of the direction to the satellite is detected. For this purpose, a direction sensor for detecting a direction based on geomagnetism is used.

With an existing technique, a satellite cannot be acquired if a direction sensor outputs a wrong value. In particular, the geomagnetism around the direction sensor is greatly affected by an environment. For example, if there is a magnetic material, or a building, a vehicle, or a bridge (these are also examples of magnetic materials) in the vicinity of the direction sensor, it is difficult to measure an accurate direction. If the direction sensor outputs a wrong measured value, an antenna cannot be directed to a communication satellite targeted for acquiring; as a consequence, sensitivity for a reception signal is insufficient, and acquiring of a satellite signal fails. In such a case, it would be necessary to search all directions for a satellite, and it would take a long time to complete acquiring a satellite signal.

It has been proposed to compare a measured value of a direction sensor when acquiring a satellite signal was successful in the past with a measured value this time to determine validity/invalidity of the value of the present time. In other words, it is an attempt to shorten total time by searching all directions for a satellite only when the measured value is determined to be invalid. However, such measures are difficult if past data is not available, and if acquiring a satellite signal in an environment different from an environment from the previous acquiring, it is necessary to perform the search from the beginning.

In general, according to the embodiments, a satellite signal acquiring apparatus includes an antenna, a direction sensor, a position sensor and at least one processor. The antenna receives radio waves from an artificial satellite. The direction sensor obtains direction information. The position sensor obtains position information. The processor directs the antenna based on the direction information obtained by the direction sensor to search a search range including a satellite target angle that is associated with the position information obtained by the position sensor for the artificial satellite. The processor calculates a level of reliability of the direction information obtained by the direction sensor. The processor narrows the search range in accordance with the level of reliability.

First Embodiment

FIG. 1 is a schematic external view of an example of a satellite communication apparatus according to an embodiment. The satellite communication apparatus 1 shown in FIG. 1 is, for example, a VSAT, and has a function as a satellite signal acquiring apparatus. The size of the satellite communication apparatus 1 is compact to the extent that a user can carry, and the weight is also limited. This satellite communication apparatus 1 can be brought to a disaster site, for example, to be utilized as an emergency communication station.

The satellite communication apparatus 1 shown in FIG. 1 includes an antenna 10, a main body 11, a tripod 12 that supports the main body 11, supporting columns 13b and 13c that physically connect the main body 11 with the antenna 10, and a transmitter/receiver 18. The main body 11 is a computer having a processor (a central processing unit (CPU), or a micro processing unit (MPU), etc.) and a memory.

The antenna 10 receives radio waves from an artificial satellite, and transmits radio waves to an artificial satellite. The size of the antenna 10 is, for example, 50 cm by 50 cm. The antenna 10 may be a planar antenna shown in FIG. 1, for example, or a parabola antenna.

The directivity of the antenna 10 is precisely formed to be used in satellite communication. Thus, it is necessary to accurately adjust, the azimuth angle (AZ angle), an elevation angle (EL angle), and a polarization angle (POL angle) of the antenna 10 with respect to a satellite around three respective axes which are mutually different.

The transmitter/receiver 18 performs frequency conversion on a radio-frequency signal that is transmitted/received through the antenna 10 into a base-band signal, for example. The transmitter/receiver 18 can be brought to the vicinity of the antenna 10, for example to be attached to the back surface of the antenna 10, thereby suppressing attenuation of a transmitted signal and a received signal.

Furthermore, a direction sensor 60 for obtaining direction information is attached to the back surface of the antenna 10, for example. By providing the direction sensor 60 to the antenna 10, the direction sensor 60 can be rotated horizontally along the azimuth axis. Thus, it is possible to rotate both of the antenna 10 and the direction sensor 60 by one motor 20, thereby cutting down cost of the apparatus.

The supporting column 13b is provided perpendicularly to the upper surface of the main body 11 (the top surface in FIG. 1), for example. The supporting column 13b rotates with respect to the main body 11 in a rotation direction A. The rotation in the rotation direction A is a rotation around the azimuth axis (AZ axis).

The supporting column 13c is attached to the supporting column 13b semi-stationarily and rotationally, and rotates with respect to the supporting column 13b in the rotation direction B. The rotation in the rotation direction B is a rotation around the elevation axis (EL axis).

The supporting columns 13b and 13c may have a foldable mechanism. If the supporting columns 13b and 13c are foldable, it is possible to further reduce the size of the satellite communication apparatus 1, and handling of the satellite communication apparatus 1 becomes easier.

The motors 20a and 20b are attached to the supporting column 13b. The motor 20c is attached to the supporting column 13c. Each motor is controlled by a control signal from the motor controller 202. The motor 20a rotates the antenna 10 around the azimuth axis. The motor 20b rotates the antenna 10 around the elevation axis. The motor 20c rotates the antenna 10 around the rotation direction C. The rotation in the rotation direction C is a rotation around the polarization axis (POL axis).

The main body 11 includes a power button 14, an acquisition button 15, and a display 90. The power button 14 is a button for turning the power of the satellite communication apparatus 1 on/off. If the acquisition button 15 is pressed down after the apparatus is turned on, processing for acquiring a satellite (satellite signal acquiring control processing) using the antenna 10 begins.

The display 90 is provided on, for example, aside surface of the main body 11, and displays a result of the satellite signal acquiring control processing, and the like. The display 90 may not be necessarily installed in the satellite communication apparatus 1, and it may be a display device that is externally installed to the satellite communication apparatus 1.

FIG. 2 is a function diagram showing an example of the satellite communication apparatus 1 shown in FIG. 1. The main body 11 includes an acquisition controller 40, a motor controller 30, a sensitivity calculator 50 for calculating reception sensitivity of antenna, a position sensor 70, an user input apparatus 80, a display 90, and a speaker 100 as a notification unit.

The motor controller 30 feeds a control signal to each of the motors 20 (20a, 20b, 20c) in accordance with an instruction regarding a directivity direction of the antenna 10 from the acquisition controller 40, and changes the directivity directions of the antenna 10 and the direction sensor 60.

The sensitivity calculator 50 calculates reception sensitivity of a signal received by the antenna 10, and sends the obtained value to the acquisition controller 40.

The direction sensor 60 obtains direction information of the satellite communication apparatus 1 by sensing geomagnetism. The directivity direction of the direction sensor 60 changes in relation to the rotation movement of the antenna 10 by the motor 20, and the obtained direction information also changes. The obtained direction information is handed off to the acquisition controller 40.

The position sensor 70 obtains position information (e.g., latitude and longitude) of a position where the satellite communication apparatus 1 is located by, for example, global positioning system (GPS). The obtained position information is handed off to the acquisition controller 40.

The user input apparatus 80 is a user interface for inputting an instruction from a user regarding automatic acquiring control. The user input apparatus 80 includes a switch for instructing start/stop of the satellite signal acquiring processing and a touch panel for selecting a acquiring-targeted satellite, for example.

The display 90 displays information related to automatic acquiring control. For example, a current processing state (e.g., "Calibrating", "Acquiring satellite signal", "Tracking") may be displayed by LEDs (light emitting diodes). Or, a result of acquiring, for example, a successful acquisition or failed acquisition, may be displayed on a liquid crystal panel along with a finish code. The speaker 100 notifies by sound a user of information related to automatic acquiring control.

The acquisition controller 40 instructs the motor controller 30 about the azimuth angle, the elevation angle, and the polarization angle of the antenna 10, and detects an angle at which the reception sensitivity of a received signal is at peak in order to acquire a targeted communication satellite. The acquisition controller 40 includes the satellite searcher 41, the direction calculator 43, and the memory 44. The memory 44 stores direction information 44a and satellite target angle table 44b.

The direction information 44a is information in which an azimuth angle (direction information) of the satellite communication apparatus 1 that is sensed by the direction sensor 60 is associated with intensity of geomagnetism.

Figures 3, 4:
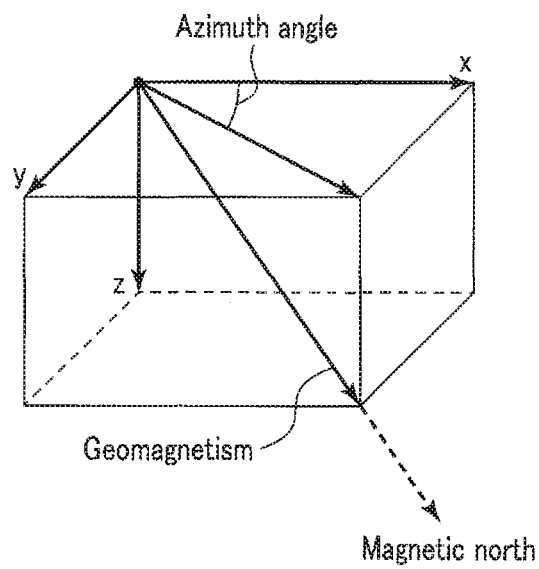

As shown in FIG. 3, the geomagnetism is a vector including an angle and intensity; thus, the direction information 44a includes both the azimuth angle and the geomagnetism intensity.

FIG. 4 is a diagram showing an example of the direction information 44a. The azimuth angle [°] and the intensity of geomagnetism [micro tesla] may be associated with a measurement type (an initial measurement or a rotational measurement, for example) and a time of measurement when they are recorded.

The satellite target angle table 44b is a table in which position information on the ground (e.g., latitude and longitude) is associated with a satellite target angle (an azimuth angle, an elevation angle, and a polarization angle) of a communication satellite to be acquired.

As shown in FIG. 5, the latitude of Sapporo city, Hokkaido is 141.4° and the longitude is 43.1°, and the target angle of the communication satellite A at this position, (an azimuth angle, an elevation angle, and a polarization angle) =(151.2°, 36.1°, 10.4°).

The explanation will continue, returning to FIG. 2. The satellite searcher 41 as a searching unit adjusts the angle of the antenna 10 while monitoring sensitivity of a signal received from the satellite, and searches for a peak position of the received signal sensitivity, thereby acquiring a satellite. In other words, the satellite searcher 41 obtains a satellite target angle associated with the position information of itself obtained by the position sensor 70 from the satellite target angle table 44b. Then, a search range including this satellite target angle is set, and the antenna 10 is directed to the search range to search for an artificial satellite. At this time, the satellite searcher 41 controls the directivity direction of the antenna 10 based on the direction information obtained by the direction sensor 60 to search the search range.

The direction calculator 43 calculates an azimuth angle of the apparatus and reliability (azimuth reliability) which is an index of reliability of the azimuth angle while rotating the direction sensor 60 around the azimuth axis at a constant speed.

Figure 6A:
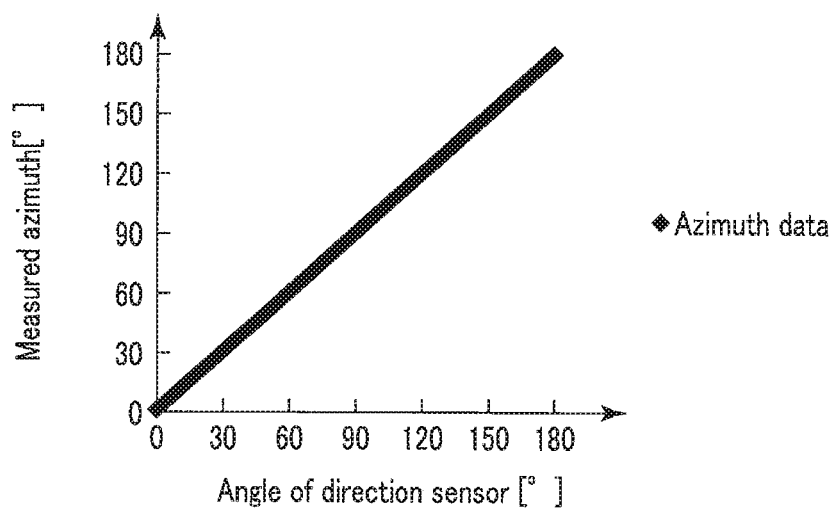
FIG. 6A is a diagram showing an example of an azimuth angle obtained by a direction calculator 43.
Figure 6B:
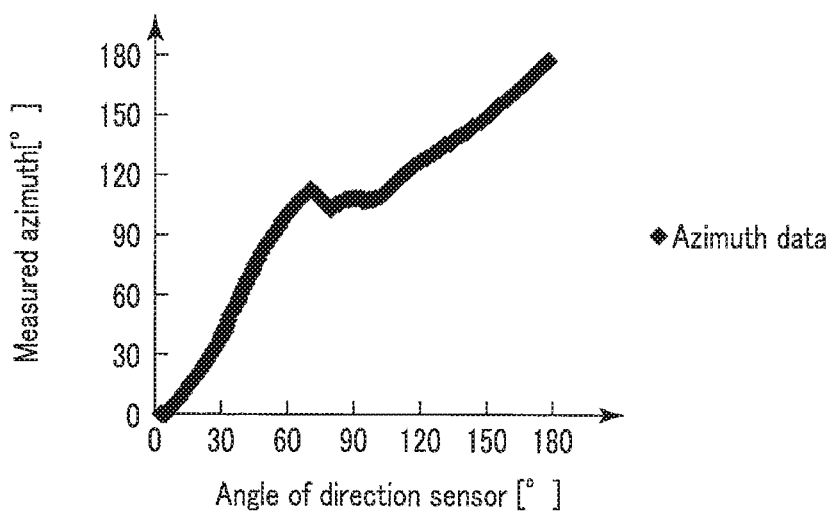
FIG. 6B is a diagram showing another example of an azimuth angle obtained by the direction calculator 43.

FIGS. 6A and 6B show an example of an azimuth angle (a measured azimuth) obtained by the direction calculator 43. The horizontal axis in each of FIGS. 6A and 6B indicates an angle of the direction sensor. The direction sensor angle indicates an angle of rotation of the direction sensor 60 around the azimuth axis.

FIG. 6A indicates direction information which is measured when there are no magnetism misleading factors around the satellite communication apparatus 1. In FIG. 6A, the measured azimuth changes linearly with respect to the direction sensor angle.

FIG. 6B indicates direction information which is measured when there are magnetism misleading factors around the satellite communication apparatus 1. The magnetism misleading factors are, for example, magnetic materials. FIG. 6B shows irregular changes of a measured azimuth with respect to the direction sensor angle. This indicates that there are magnetism misleading factors around the satellite communication apparatus 1.

Figure 7A:
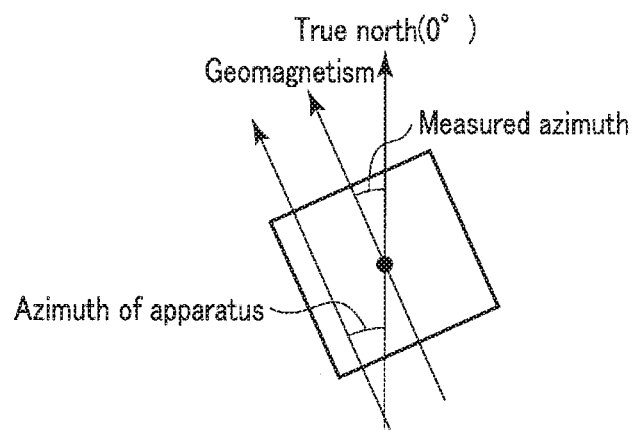
FIG. 7A is a drawing showing the direction information being affected by a magnetic material.
Figure 7B:
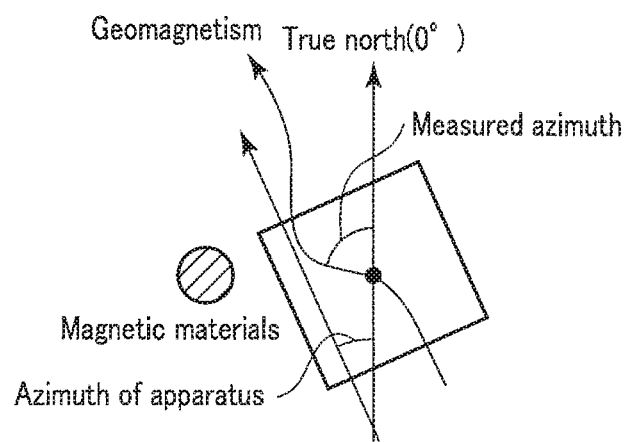
FIG. 7B is a drawing showing the direction information being affected by a magnetic material.

Geomagnetism is mainly used for measuring an azimuth. As shown in FIGS. 7A and 7B, the geomagnetism is greatly affected by a surrounding environment (magnetic materials, such as buildings, vehicles, and bridges). If there are no magnetic materials around the apparatus as shown in FIG. 7A, a direction can be measured using the geomagnetism. Conversely, if there are magnetic materials as shown in FIG. 7B, it is difficult to measure an azimuth using geomagnetism.

The direction calculator 43 evaluates both the reliability of the direction information obtained under the condition shown in FIG. 6B and the reliability of the direction information obtained under the condition shown in FIG. 7B, and determines that they are low. If the reliability becomes lower than a determined value, a user is notified by sound from the speaker 100 or by a display on the display 90.

The satellite searcher 41 changes the search range for satellite search based on reliability of the direction information. In other words, the higher the reliability becomes, the further the satellite searcher 41 narrows the search range. Thus, a time required for satellite search can be shortened as much as possible.

As shown in FIG. 8, the reliability and the search range can be set into three stages, for example. If the reliability value falls under the range of 1 to 0.95, ±5° around the satellite target angle is set as the search range (i.e., 10°), for example. If the reliability value falls under the range of 0.95 to 0.9, ±10° around the satellite target angle is set as the search range (i.e., 20°), for example. If the reliability value is 0.9 or lower, ±15° around the satellite target angle is set as the search range (i.e., 30°), for example.

Figure 9:
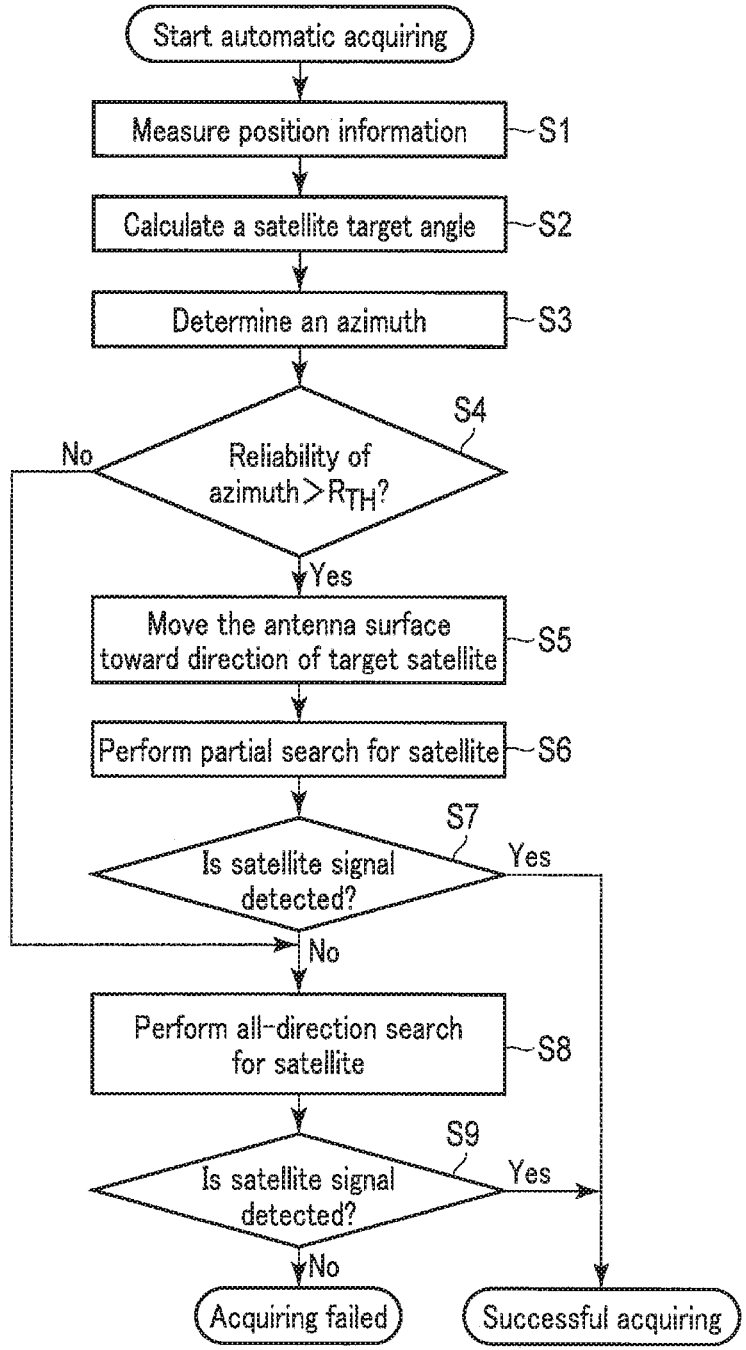
FIG. 9 is a flow chart illustrating an example of a processing procedure of the satellite communication apparatus 1 according to the first embodiment.

FIG. 9 is a flow chart illustrating an example of a processing procedure of the satellite communication apparatus 1 according to the first embodiment.

In step S1, the satellite communication apparatus 1 measures a latitude and a longitude of a position of the apparatus itself, using the position sensor 70.

Next, in step S2, the satellite communication apparatus 1 searches the satellite target angle table 44b based on the latitude and longitude of the position information measured in step S1, and calculates an azimuth angle, an elevation angle, and a polarization angle of a satellite to be acquired. Herein, a acquiring-targeted satellite may be preset in the apparatus, or may be selected from the user input apparatus 80.

Next, in step S3, the satellite communication apparatus 1 obtains an azimuth angle and reliability of the apparatus by the direction calculator 43.

In step S4, if the reliability is lower than a threshold $R_{TH}$, it is highly possible that the azimuth angle of the apparatus obtained in step S3 is offset from a correct azimuth angle.

Accordingly, even if partial search is carried out in step S6, it is likely that a satellite signal cannot be detected ("No" in step S7). For this reason, the satellite communication apparatus 1 skips step S6, and carries out an all-direction search in step S8.

In step S5, the satellite communication apparatus 1 instructs the motor controller 30 to rotate the antenna control axis to direct the antenna 10 to a satellite target angle that is determined in step S2. The antenna control angle is determined in consideration of the azimuth angle obtained in step S3 in such a manner that the antenna 10 is directed to the satellite target angle. For example, if the satellite target azimuth angle is 140° and the measured azimuth of the satellite signal acquiring apparatus is 30°, the angle instructing value of the azimuth angle control axis is 110°.

Since the antenna 10 is directed in the vicinity of a satellite to be acquired as a result of the processing in step S5, it is assumed that a peak of reception sensitivity is in the proximity of the directivity direction. In step S6, the satellite communication apparatus 1 changes an antenna angle within a partial range in the vicinity of the directivity direction, and measures reception sensitivity in the range to search for a peak. The search range is determined by the directivity characteristics of the antenna 10 and the measurement accuracy of the direction sensor 60, and it is preferable to set the search range between 10° and 45°.

In step S7, if a peak of the reception sensitivity can be detected in step S6, it is determined that a satellite signal is detected, and the satellite communication apparatus 1 finishes automatic acquiring processing with a status of successful acquiring. At this time, the display 90 may display a successful acquiring status, or the speaker 100 may make a sound to indicate the success of acquiring. If no peak can be detected, the processing procedures proceeds to step S8 to search for a acquiring-targeted satellite in all directions.

In step S8, similar to step S6, the satellite communication apparatus 1 searches for a peak of the reception sensitivity.

In step S8, the satellite communication apparatus 1 sets the search range of the antenna 10 to all directions (360°). Accordingly, it takes a longer time for the processing in step S8 in comparison with the processing in step S6. For example, in step S8, the required search time is 8 to 36 times longer than the search time required in step S6.

In step S9, if a peak of the reception sensitivity can be detected similar to step S7, it is determined that a satellite signal is detected, and the satellite communication apparatus 1 finishes automatic acquiring processing with a status of successful acquiring. If no peak can be detected, the satellite communication apparatus 1 finishes automatic acquiring processing with a status of failed acquiring. At this time, the display 90 may display a successful/failed acquiring status, or the speaker 100 may make a sound to indicate the success/failure of acquiring.

Figure 10:
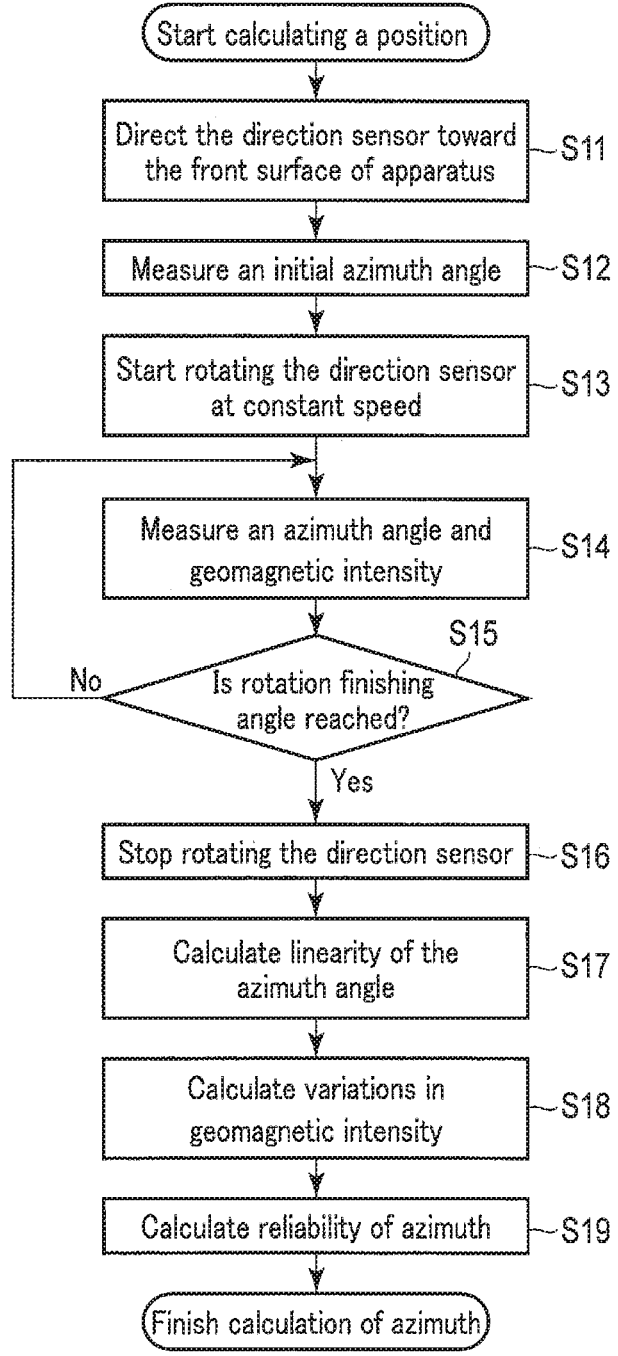
FIG. 10 is a flow chart showing an example of a processing procedure related to calculation of reliability.

FIG. 10 is a flowchart showing an example of a processing procedure related to calculation of reliability. This procedure may be performed as a so-called calibration for obtaining direction information.

In step S11, the satellite communication apparatus 1 controls the motor 20 to move the antenna 10 to a preset position. The direction sensor 60 attached to the antenna 10 is thereby directed to the front surface of the apparatus.

In step S12, the satellite communication apparatus 1 measures an initial azimuth angle of the satellite communication apparatus 1 by the direction sensor 60. This initial azimuth angle is recorded in the direction information 44a (FIG. 4) with an indication of measurement type "initial".

In step S13, the satellite communication apparatus 1 starts rotating the motor 20 at a constant speed. The direction sensor 60 is thereby rotated around the azimuth axis. The rotation speed of the direction sensor 60 is determined based on control performance of the motor and a measured load on the direction sensor 60.

In step S14, the satellite communication apparatus 1 measures an azimuth angle and geomagnetism intensity by the direction sensor 60. The obtained measurement value is recorded in the direction information 44a (FIG. 4) with an indication of measurement type "rotational". The procedures in step S14 is repeated until the azimuth angle reaches a predetermined rotation finishing angle (step S15).

In step S16, if the rotation finishing angle is reached, the rotation of the direction sensor 60 is stopped. To scan the surrounding area of the satellite communication apparatus 1 without leaving un-scanned areas, the direction sensor is rotated 360° around the azimuth axis to the rotation finishing angle, that is, the initial azimuth angle. By limiting the rotation angle to 0° to 180°, the time required for processing can be shortened.

Figure 11A:
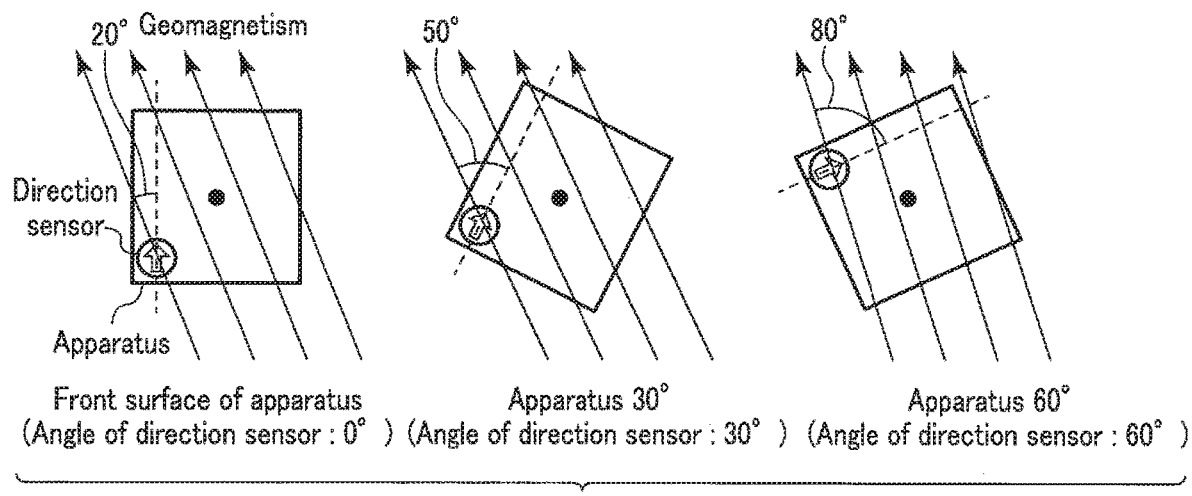
FIG. 11A is a drawing showing an example of a case where the linearity of an azimuth angle shows favorable characteristics.
Figure 11B:
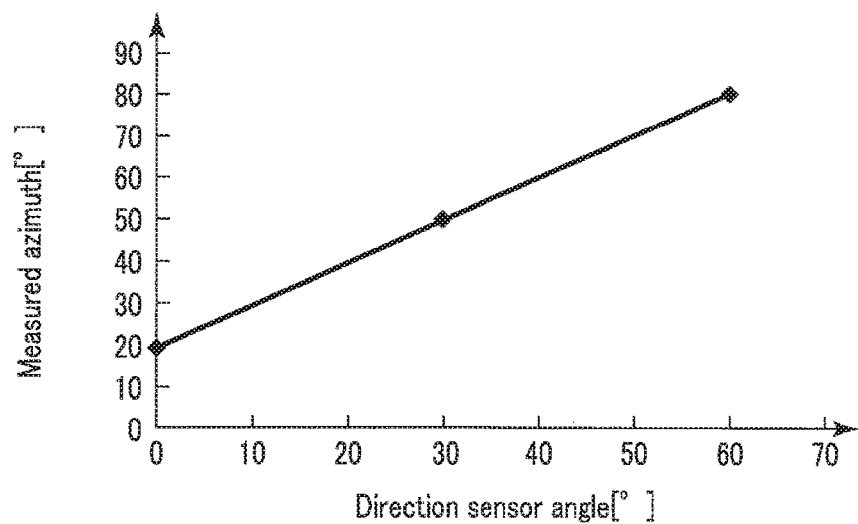
FIG. 11B is a drawing showing an example of a case where the linearity of an azimuth angle shows favorable characteristics.

In step S17, the satellite communication apparatus 1 calculates linearity of the azimuth angle recorded in the direction information 44a. If there are no magnetic materials around the apparatus as shown in FIG. 11A, the azimuth angle measured by the direction sensor 60 linearly increases or decreases over time as shown in FIG. 11B.

Figure 12A:
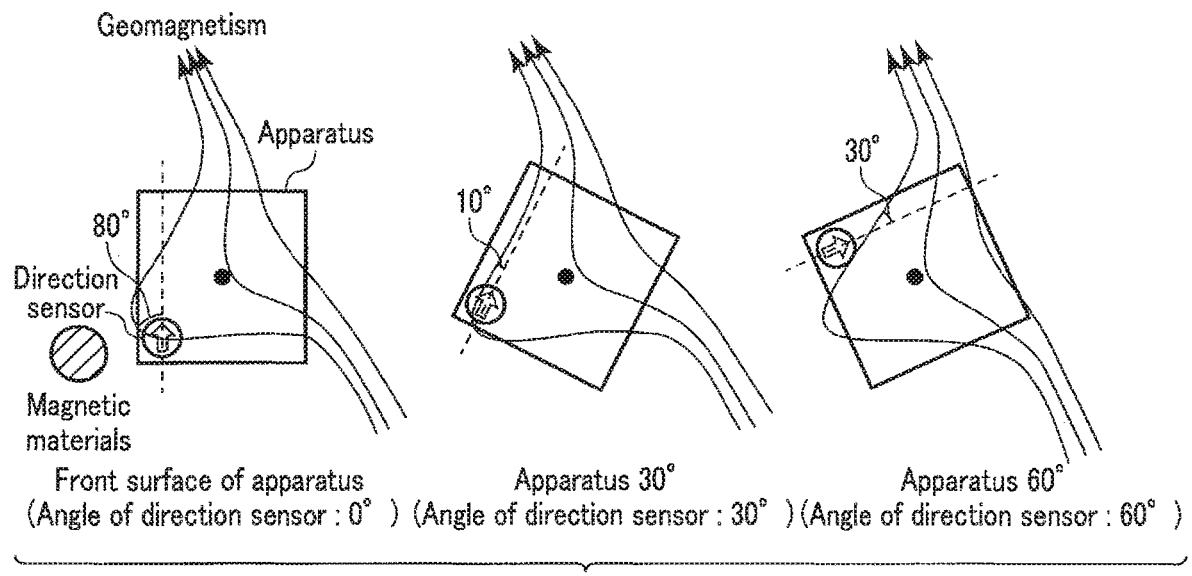
FIG. 12A is a drawing showing an example of an environment where the linearity of an azimuth angle is bad.
Figure 12B:
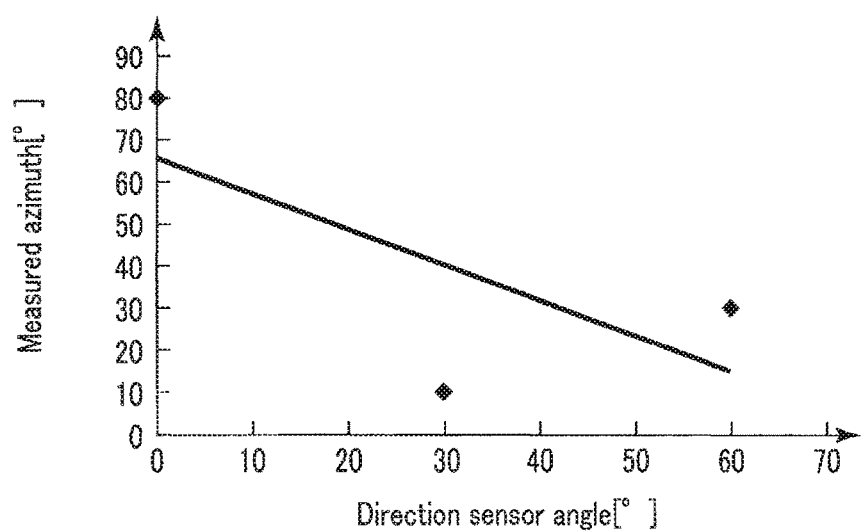
FIG. 12B is a drawing showing an example of an environment where the linearity of an azimuth angle is bad.

However, if there are magnetic materials around the apparatus as shown in FIG. 12A, the linearity of the azimuth angle becomes lower as shown in FIG. 12B.

The linearity of the azimuth angle is evaluated by a contribution rate (R2), which is obtained by linear approximation of the measured azimuth angle by a least squares method, for example. If reliability is determined only by linearity of an azimuth angle, the reliability can be calculated using expression (1), for example:

$$\text{Azimuth reliability}(R)=\text{Contribution rate of linear approximation by a least squares method }(R^2) \quad (1)$$

In step S18, the satellite communication apparatus 1 calculates variations of the geomagnetic intensity recorded in the direction information 44a. If there are no magnetic materials around the apparatus, the geomagnetic intensity to be measured will only be natural geomagnetism (geomagnetism of the earth); thus, it becomes constant. However, if there are magnetic materials around the apparatus, the geomagnetism to be measured includes influences from magnetic fields caused by the magnetic materials of the surrounding area; thus, the measured value would varies. The variations of magnetic intensity may be evaluated by a standard deviation ($\sigma$) of measured geomagnetic intensity, for example. For another example, the variations of magnetic intensity may be evaluated by a rate of measured values that exceed the range of variations of geomagnetism in the natural world (e.g., 100 nano tesla [nT]).

If reliability is determined using the variations of geomagnetic intensity only, the reliability is calculated by the expression (2), for example:

$$\text{Azimuth reliability}(R)=1-\sigma \quad (2)$$

If reliability is determined by combining linearity of an azimuth angle and geomagnetism, the reliability is calculated by the expression (3), for example:

$$\text{Azimuth reliability}(R)=\text{Contribution rate of linear approximation by a least squares method}(R^2)\times 0.5+(1-\sigma)\times 0.5 \quad (3)$$

In step S19, the satellite communication apparatus 1 determines reliability of direction information. The reliability can be determined by linearity of the azimuth angle calculated in step S17 or the variations of geomagnetic intensity calculated in step S18, or a combination thereof. The reliability is defined as a value between 0 and 1, for example. It is understood that the closer to 1 the reliability is, the higher the possibility that the initial azimuth angle indicates an azimuth of the apparatus becomes.

As explained above, in the first embodiment, the reliability of direction information is calculated, and the time required for acquiring a satellite signal is shortened by narrowing the search range based on the calculated reliability. In other words, the linearity of the direction information obtained by the direction sensor 60, or an index indicating variations is calculated, and the higher the linearity is, or the less the variations are, the more a reliability value of the direction information is increased. The higher the value becomes, the more the search period can be shortened by narrowing the satellite search range, thereby decreasing the time required for acquiring a satellite signal.

Thus, a user of the satellite communication apparatus 1 is able to start a communication earlier, and has an advantage under the circumstance where urgency is prioritized, for example, a disaster prevention and administrative radio system. If the reliability is low, a partial satellite search is omitted, so that certainty is secured, and such a situation is notified to a user.

Thus, a satellite signal acquiring apparatus and a satellite signal acquiring method that can shorten time required for acquiring a satellite can be provided.

Second Embodiment

Next, the second embodiment will be described. In the second embodiment, a stop angle is considered to shorten the time for completing acquiring.

Figure 13:
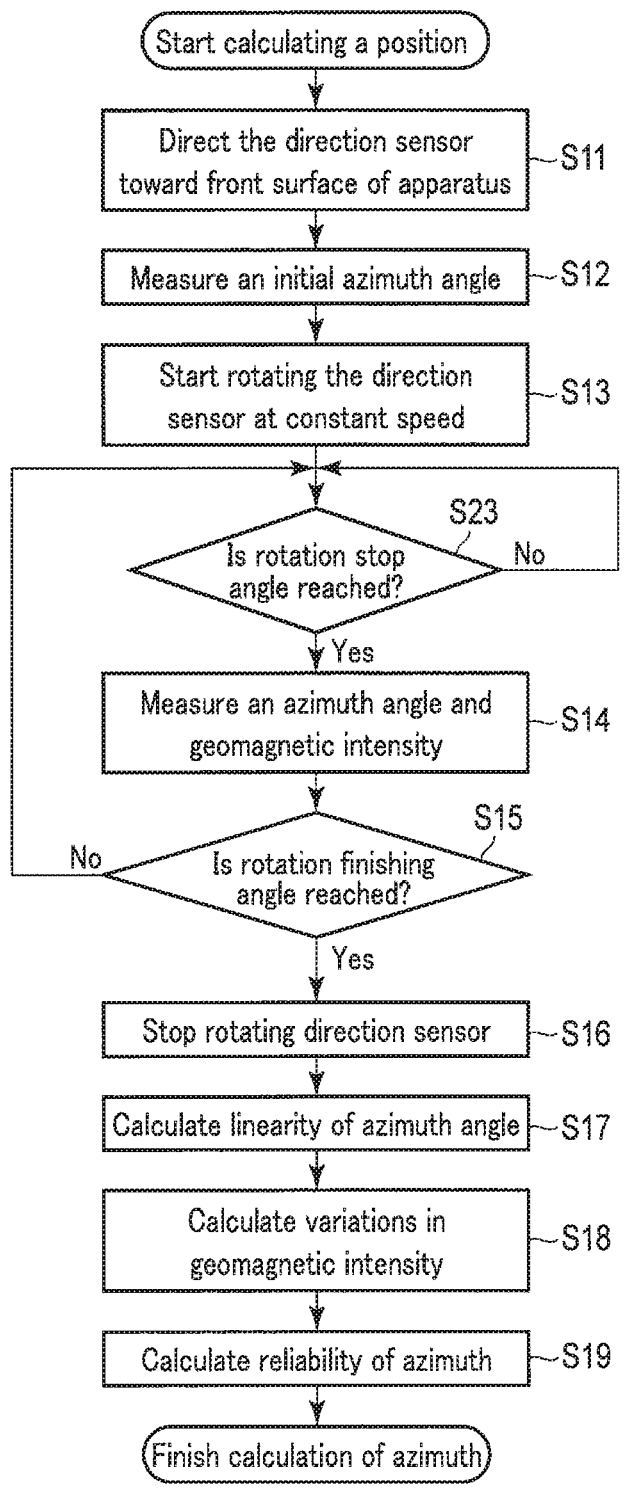
FIG. 13 is a flow chart illustrating an example of a processing procedure of the satellite communication apparatus 1 according to the second embodiment.

FIG. 13 is a flow chart illustrating an example of a processing procedure of the satellite communication apparatus 1 according to the second embodiment. The same steps as those in FIG. 10 are referenced by the same numbers.

Since the procedure from step S11 to step S13 is the same as that in FIG. 10, the description thereof is omitted.

In step S23, after rotation of the direction sensor 60 at a constant speed is started in step S13, the satellite communication apparatus 1 determines whether the angle of the direction sensor 60 reaches a stop angle or not. The stop angle may be an evenly-spaced angle, such as 10°, 20°, and 30°. Only when the angle reaches the stop angle, does the satellite communication apparatus 1 measure an azimuth angle and intensity of geomagnetism (step S14). The procedure hereafter is the same as that shown in FIG. 10.

The number of times of performing measurement for the direction sensor 60 can thereby be reduced, and the rotation speed of the direction sensor 60 can thereby be increased. By increasing the rotation speed, the time required for completing acquiring can be shortened.

Third Embodiment

Next, the third embodiment will be described. In the third embodiment, if reliability of azimuth measurement is low, azimuth measurement is not performed.

Figure 14:
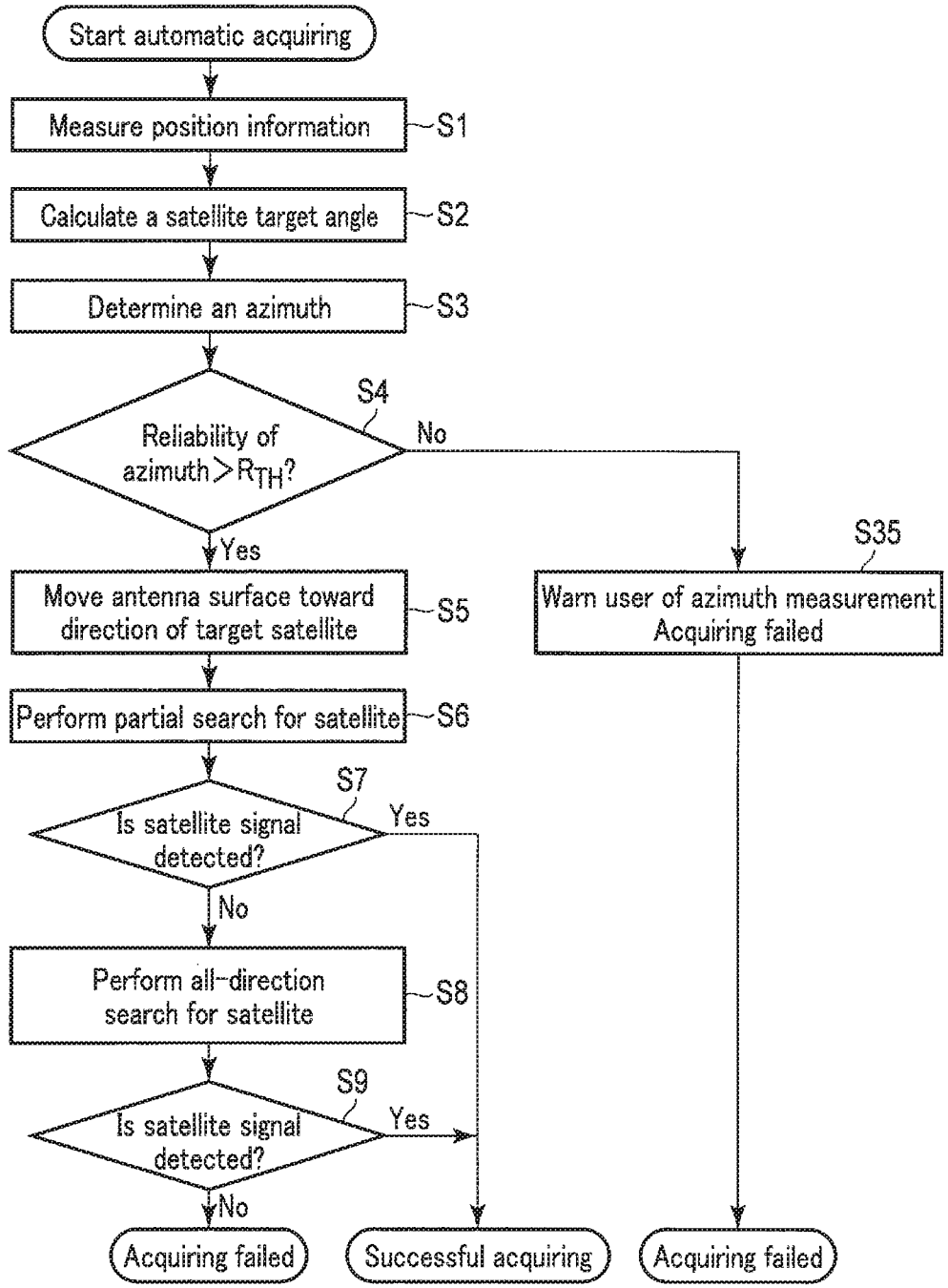
FIG. 14 is a flow chart illustrating an example of a processing procedure of the satellite communication apparatus 1 according to the third embodiment.

FIG. 14 is a flow chart illustrating an example of a processing procedure of the satellite communication apparatus 1 according to the third embodiment. The same steps as those in FIG. 9 are referenced by the same numbers, and different steps will be described herein.

Step S1 to step S4 are the same as those shown in FIG. 9.

In step S4, the satellite communication apparatus 1 determines the reliability of direction information. If the reliability is lower than a threshold $R_{TH}$ ("No" in step S4), the satellite communication apparatus 1 warns a user at step S35. For example, a warning message is displayed on the display 90, or warning sound is output from the speaker 100, thereby notifying a warning concerning azimuth measurement. A user is thereby prompted to change the position, and the magnetic materials in the vicinity of the satellite communication apparatus 1 can be removed. Thus, time wasted in performing automatic satellite acquiring over a long time can be eliminated.

The present invention is not limited to the foregoing embodiments. For example, linearity of the azimuth angle may be evaluated without waiting for completion of scanning in the range of all angles of the direction sensor 60. For example, obtaining of the direction information and evaluation of linearity of the azimuth angle may be performed in parallel, and if the linearity is lower than a predetermined threshold, the processing is stopped. The time required for acquiring a satellite can also thus be shortened.

Since there are magnetic materials inside the satellite communication apparatus 1, such as a motor and a power source device, an influence of such magnetic materials may be observed depending on the range of rotation. By rotating the direction sensor 60 within a range where the direction sensor 60 is not influenced by the magnetic materials, the reliability can be calculated more accurately. In other words, the direction sensor 60 may be rotated within a range where the influence of the magnetic materials inside the satellite communication apparatus 1 can be ignored.

The programs for realizing the satellite communication apparatus 1 may be recorded in a computer-readable recording medium. In this case, a computer system reads the programs recorded in the recording medium and executes them to realize the image processing. The term "computer system" used herein may include an operating system (OS) or hardware such as a peripheral device.

The computer-readable recording medium is a recordable nonvolatile memory (such as a flexible disk, a magneto-optical disk, a ROM or a flash memory), a portable medium (such as a CD-ROM), or a hard disk built-in in a computer system.

Furthermore, a computer-readable recording medium may be any type of storage capable of storing programs for a certain length of time, including a server to which programs are transmitted by way of a network (such as the Internet) or a communication line (such as a telephone line), and a volatile memory of a computer system serving as a client (such as a dynamic random access memory (DRAM)).

The programs may be transmitted from the computer system incorporating a storage in which they are stored to another computer system, by way of a transmission medium or by use of a carrier wave for the transmission medium. The "transition medium" used herein is intended to refer to a medium capable of transmitting information, including a network (communication network) such as the Internet or a communication line such as a telephone line.

The term "processor" used in the above explanations indicates, for example, a central processing unit (CPU), a Graphics Processing Unit (GPU), or circuits such as an Application Specific Integrated Circuit (ASIC), or a Programmable Logic Device (for example, a Simple Programmable Logic Device (SPLD), a Complex Programmable Logic Device (CPLD), or a Field Programmable Gate Array (FPGA)).

The processor reads the programs stored in the storage circuit and executes them to realize the respective functions. The programs may be incorporated in the circuit of the processor, instead of storing them in the storage circuit. In this case, the processor reads the programs incorporated in its circuit and executes them to realize the respective functions. The processors described in connection with the above embodiment are not limited to single-circuit processors. A plurality of independent processors may be combined and integrated as one processor having multiple functions. Furthermore, a plurality of structural elements of the above embodiment may be integrated as one processor having multiple functions.

While certain embodiments have been described, these embodiments have been presented by way of example only, and are not intended to limit the scope. Indeed, the novel embodiments described herein may be embodied in a variety of other forms; furthermore, various omissions, substitutions and changes in the form of the embodiments described herein may be made without departing from the spirit of the embodiments. The accompanying claims and their equivalents are intended to cover such forms or modifications as would fall within the scope and spirit of the embodiments.

What is claimed is:

1. A satellite signal acquiring apparatus, comprising:
   an antenna configured to receive radio waves from an artificial satellite;
   a direction sensor configured to obtain direction information of the antenna of the satellite signal acquiring apparatus, the direction information comprising information indicative of influences from magnetic fields caused by magnetic materials of a surrounding area; and
   a position sensor configured to obtain position information;
   at least one processor, wherein
   the processor is configured to:
      direct the antenna based on the direction information obtained by the direction sensor to search a search range including a satellite target angle that is associated with the position information obtained by the position sensor for the artificial satellite;
      calculate azimuth reliability of the direction information obtained by the direction sensor; and
      narrow the search range in accordance with the azimuth reliability.

2. The satellite signal acquiring apparatus of claim 1, further comprising
   a drive section configured to rotate the direction sensor around an axis, wherein
   the processor is configured to calculate the azimuth reliability based on a relationship between an angle of the rotation of the direction sensor around the axis and the obtained direction information.

3. The satellite signal acquiring apparatus of claim 2, wherein
   the drive section rotates the direction sensor around an azimuth axis at a constant speed,
   the processor is configured to calculate the azimuth-reliability based on linearity of the azimuth with respect to the rotation angle, or variations of the direction information with respect to the rotation angle.

4. The satellite signal acquiring apparatus of claim 2, wherein the drive section intermittently rotates the direction sensor around the azimuth axis, and the processor is configured to calculate the azimuth reliability based on linearity of the azimuth with respect to the rotation angle, or variations of the direction information with respect to the rotation angle.

5. The satellite signal acquiring apparatus of claim 2, wherein
   the drive section stops rotation of the direction sensor if the azimuth reliability becomes lower than a threshold value.

6. The satellite signal acquiring apparatus of claim 2, wherein
   the drive section rotates the direction sensor within a range in which influences of magnetic materials in the satellite signal acquiring apparatus can be ignored.

7. The satellite signal acquiring apparatus of one of claims 2 to 6, wherein
   the direction sensor is attached to the antenna, and
   the drive section rotates the antenna around the axis.

8. The satellite signal acquiring apparatus of claim 1, further comprising
   a notifying unit configured to notify a user that the azimuth-reliability has become lower than a threshold value.

9. The satellite signal acquiring apparatus of claim 1, further comprising
   a memory storing a satellite target angle table in which position information is associated with the satellite target angle, wherein
   the processor obtains the satellite target angle from the satellite target angle table.

10. A satellite signal acquiring method that is executed by a computer of a satellite signal acquiring apparatus having an antenna for receiving radio waves from an artificial satellite, the method comprising:
    obtaining, by the computer, a satellite target angle associated with direction information obtained by a direction sensor configured to obtain direction information of the antenna of the satellite signal acquiring apparatus, the direction information comprising information indicative of influences from magnetic fields caused by magnetic materials of a surrounding area;
    directing, by the computer, the antenna to a search range including the satellite target angle obtained by the direction sensor for the artificial satellite;
    calculating, by the computer, azimuth reliability of the direction information obtained by the direction sensor; and
    narrowing, by the computer, the search range in accordance with the azimuth reliability.

11. The satellite acquiring method of claim 10, further comprising:
    rotating, by the computer, the direction sensor around an axis;
    calculating, by the computer, the azimuth-reliability based on a relationship between an angle of the rotation of the direction sensor around the axis and the obtained direction information.

12. The satellite signal acquiring method of claim 11, wherein
    the computer rotates the direction sensor around an azimuth axis at a constant speed, and
    the computer calculates the azimuth-reliability based on linearity of the azimuth with respect to the rotation angle, or variations of the direction information with respect to the rotation angle.

13. The satellite signal acquiring method of claim 11, wherein the computer intermittently rotates the direction sensor around the azimuth axis, and the computer calculates the azimuth reliability based on linearity of the azimuth with respect to the rotation angle, or variations of the direction information with respect to the rotation angle.

14. The satellite signal acquiring method of claim 11, wherein the computer stops rotation of the direction sensor if the azimuth reliability becomes lower than a threshold value.

15. The satellite signal acquiring method of claim 10, wherein
   the computer rotates the direction sensor within a range in which influences of magnetic materials in the satellite signal acquiring apparatus can be ignored.

16. The satellite signal acquiring method of claim 10, wherein
   the computer notifies a user that the azimuth-reliability becomes lower than a threshold value.

17. The satellite acquiring method of claim 10, further comprising:
   obtaining, by the computer, the satellite target angle from a satellite target angle table stored in a memory, the satellite target angle table associating position information with the satellite target angle.

* * * * *